Nov. 13, 1934.  W. GRUNZIG ET AL  1,980,519
RADIO-ACTIVE RUBBER THREADS
Filed May 21, 1932
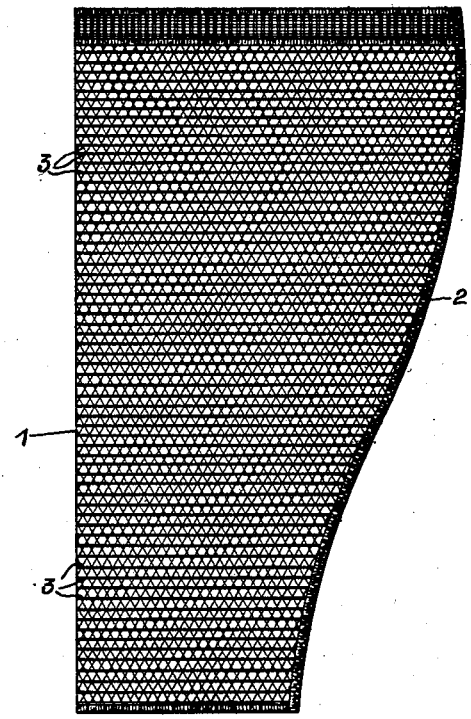
Inventors:
WALTER GRUNZIG
CARL BAUMGÄRTEL
BY
Oscar A. Geier
ATTORNEYS Patented Nov. 13, 1934

1,980,519

UNITED STATES PATENT OFFICE 1,980,519

RADIO-ACTIVE RUBBER THREADS

Walter Grunzig, Stuttgart, and Carl Baumgärtel, Zeulenroda, Germany, assignors to Julius Rompler Aktiengesellschaft, Zeulenroda, Germany Application May 21, 1932, Serial No. 612,682
In Germany June 1, 1931

3 Claims. (Cl. 174—88)

This invention relates to garments, bandages and other articles worn on the body having rubber threads therein of a radio-active character, and to a method of producing these threads.

These garments, bandages, etc., are of such nature that the same, generally speaking, provide relief and exercise a healing effect as a result of their compression by reason of the rubber threads contained in the same. Assuming it is merely a matter of maintaining the form of the body, or parts of the body, with the relief or healing effect associated therewith, this compressive action is quite sufficient. The healing effect, however, may be considerably enhanced by allowing a radio-active effect to be exerted on the body in direct fashion by means of these garments, etc., through the medium of the radium rays. In this connection it is not sufficient to treat the textile threads with the radio-active substances employed for the purpose in question, and these substances require to be embedded or incorporated in the rubber threads, so that the garments, etc., may be washed without the radio-active substances, which are usually of a water-soluble nature, being removed upon the cleansing operation.

The essence of the invention accordingly resides in the incorporation of radio-active substances in the rubber threads employed in the production of the garments, bandages, etc. These radio-active rubber threads may be introduced in the form of weft threads into the looped fabric, or they may be employed in immediate fashion for producing the loops. The rubber threads employed may be raw, or they may have textile or other threads woven or plaited about them.

An additional feature of the invention resides in the fact that the radio-active substances are incorporated in the rubber threads, when the latter are being produced. This may be performed in simple fashion by introducing the radio-active substance into the rubber in the manner of the color or the sulphur for vulcanization purposes.

This method of production, however, is accompanied by the disadvantage that as a result of inattention in the manufacture relatively large quantities of radio-active substance may readily accumulate at single points of the rubber threads, and by reason of their short-wave radiation not only attack the molecular complex of the rubber but also exert detrimental effect on the part of the body under treatment.

This objection may be overcome by adding watery solutions of the radio-active substance to the basic substance of the rubber, i. e., the so-called latex, prior to the precipitation of the rubber. The precipitation of the rubber from the latex may be so performed that the rubber molecules deposited together with the protective colloid take up in homogeneous distribution the greater part of the radio-active substance introduced into the latex. The remainder of the dissolved or undissolved radio-active substance in the latex may be fully recovered and made use of by evaporation of the latex.

The rubber mass thus produced may be worked into threads in the usual manner. Owing to the homogeneous distribution of the radio-active substances these threads are of normal durability, and may readily be washed without the radio-active substance being expelled as a result of this operation, as the water or detergent employed is unable to reach the radio-active substance incorporated in the threads.

The radio-activity of the rubber threads is thus maintained for such time as the threads may continue to last.

For the purpose of obtaining the radio-active effect there may be employed radium salts of various kinds, such, for example, as thorium salts.

The invention will now be described more fully with reference to the accompanying drawing, which illustrates by way of example a possible form of embodiment of a bandage according to the invention.

The bandage is intended for the treatment of varicose veins. The same, however, may also be employed for other purposes, for example as body belt, brassière or hip belt, or for corsets or the like. The bandage may be of flat or round form or cut to any desired shape.

The bandage as illustrated in the drawing is produced in the form of shaped fabric on a flat bar knitting machine. The same consists of the looped fabric 1, the edges of which are connected in the known manner by a seam 2 to form a tubular bandage. In the looped fabric there are included weft threads 3 composed of rubber made to be radio-active by the incorporation of a radio-active substance therein during the manufacture. These threads may either consist of plain rubber, or textile or other threads may be woven, plaited or otherwise applied about the same.

The looped fabric may also be produced from radio-active rubber threads, whereby the same may be furnished with or without the rubber weft threads in accordance with the degree of compression required.

It will be understood that no restriction is made to the specific form of embodiment illustrated in the drawing, which has been quoted merely by way of example, and that various modifications are quite possible within the meaning of the above description and the annexed claims without departing from the spirit of the invention.

Thus, for example, the invention also extends to the use of radio-active rubber threads for articles of clothing of all kinds, and more particularly underwear, into which the rubber threads may be woven, knitted or otherwise applied so as to constitute part of the finished article.

What we claim as new and desire to secure by Letters Patent is:

1. A method of manufacturing radio-active garments, bandages or the like, comprising adding an aqueous solution of a radio-active material to a rubber latex, precipitating radio-active rubber from the mixture, forming rubber threads out of said rubber, and working the radio-active rubber threads into a textile fabric.

2. A method of manufacturing radio-active garments, bandages or the like, comprising adding an aqueous solution of a radio-active material to a rubber latex, precipitating radio-active rubber from the mixture, forming rubber threads out of said rubber, and surrounding said rubber threads by textile fibres.

3. A method of manufacturing radio-active garments, bandages or the like, comprising adding an aqueous solution of a radio-active material to a rubber latex, precipitating radio-active rubber from the mixture, forming rubber threads out of said rubber, and introducing said rubber threads in the form of weft threads into a textile material.

WALTER GRUNZIG.
CARL BAUMGÄRTEL.